(12) United States Patent
Ogawa

(10) Patent No.: US 11,816,785 B2
(45) Date of Patent: Nov. 14, 2023

(54) IMAGE PROCESSING DEVICE AND IMAGE PROCESSING METHOD

(71) Applicant: SONY GROUP CORPORATION, Tokyo (JP)

(72) Inventor: Kouji Ogawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 36 days.

(21) Appl. No.: 17/596,143

(22) PCT Filed: Jun. 1, 2020

(86) PCT No.: PCT/JP2020/021543
§ 371 (c)(1),
(2) Date: Dec. 3, 2021

(87) PCT Pub. No.: WO2020/250726
PCT Pub. Date: Dec. 17, 2020

(65) Prior Publication Data
US 2022/0245887 A1    Aug. 4, 2022

(30) Foreign Application Priority Data

Jun. 14, 2019   (JP) ................................ 2019-110795

(51) Int. Cl.
*G06T 15/20*   (2011.01)
*G06T 7/70*   (2017.01)

(52) U.S. Cl.
CPC ................ *G06T 15/20* (2013.01); *G06T 7/70* (2017.01); *G06T 2207/20092* (2013.01)

(58) Field of Classification Search
None
See application file for complete search history.

(56) References Cited

U.S. PATENT DOCUMENTS

| 2006/0132637 A1 | 6/2006 | Imanura |
| 2013/0208948 A1* | 8/2013 | Berkovich ........... H04N 13/204 348/46 |

(Continued)

FOREIGN PATENT DOCUMENTS

| CN | 1981305 A | 6/2007 |
| JP | 2006-174189 A | 6/2006 |

(Continued)

OTHER PUBLICATIONS

International Search Report and Written Opinion of PCT Application No. PCT/JP2020/021543, dated Aug. 11, 2020, 13 pages of ISRWO.

(Continued)

*Primary Examiner* — Frank S Chen
(74) *Attorney, Agent, or Firm* — CHIP LAW GROUP

(57) ABSTRACT

Provided are an image processing device and an image processing method that enable simple generation of a plurality of viewpoint images of a free viewpoint image. The image processing device determines, corresponding to a user operation, a virtual-viewpoint data group including respective pieces of data of a plurality of virtual viewpoints to a predetermined 3D object, and generates, for the plurality of virtual viewpoints, respective virtual viewpoint images each as an image of the 3D object viewed from a corresponding virtual viewpoint.

11 Claims, 15 Drawing Sheets

(56) References Cited

U.S. PATENT DOCUMENTS

| | | | |
|---|---|---|---|
| 2015/0169165 A1* | 6/2015 | Bacus | G06F 3/04883 |
| | | | 715/863 |
| 2017/0249784 A1* | 8/2017 | Ohnishi | G06T 19/20 |
| 2018/0204381 A1 | 7/2018 | Kanatsu et al. | |
| 2021/0209835 A1* | 7/2021 | Fonseka | G06T 15/205 |

FOREIGN PATENT DOCUMENTS

| | | |
|---|---|---|
| JP | 2018-112997 A | 7/2018 |
| JP | 2018-182428 A | 11/2018 |
| KR | 10-2007-0088445 A | 8/2007 |

OTHER PUBLICATIONS

TIME&SPACE(KDDI), "Realization of 'Watching from Your Preferred Angle'! The World's First Attempt Using 5G" to "Applicable to Sports Other than Baseball Events, Concerts", Jul. 17, 2018, 12 pages.

KDDI official, "Open Experiment in Real Time Free Viewpoint Viewing of Pro Baseball Utilizing au5G", Youtube, Jun. 27, 2018.

Kashiwakuma, et al., "A 3D Free-Viewpoint Video Browsing Interface with Multi-Touch Manipulation", Proceedings of the Annual Conference of the Virtual Reality Society of Japan, Virtual Reality Society of Japan, vol. 16, Sep. 20, 2011, pp. 674-677.

* cited by examiner

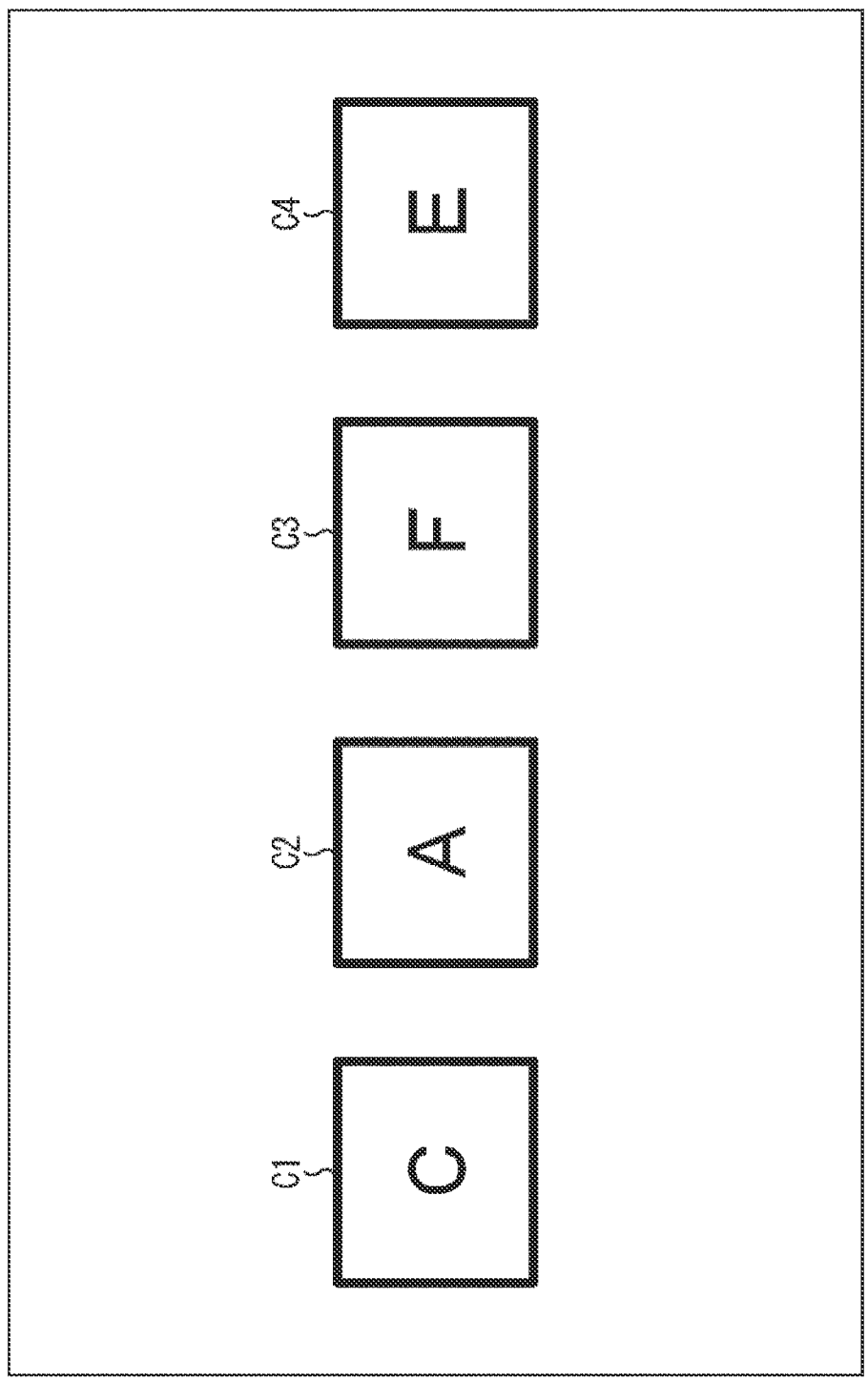

IMAGE PROCESSING DEVICE AND IMAGE PROCESSING METHOD

CROSS REFERENCE TO RELATED APPLICATIONS

This application is a U.S. National Phase of International Patent Application No. PCT/JP2020/021543 filed on Jun. 1, 2020, which claims priority benefit of Japanese Patent Application No. JP 2019-110795 filed in the Japan Patent Office on Jun. 14, 2019. Each of the above-referenced applications is hereby incorporated herein by reference in its entirety.

TECHNICAL FIELD

The present technology relates to an image processing device and an image processing method, and particularly, to an image processing device and an image processing method that enable simple generation of a plurality of viewpoint images of a free viewpoint image.

BACKGROUND ART

In recent years, free viewpoint images have been attracted attention. Such a free viewpoint image is a moving image in which the user can freely change the viewpoint, and is expected to be applied to various types of moving image content.

Various techniques for improving operability at the time of viewing/listening of a free viewpoint image have been proposed. For example, Patent Document 1 proposes a technique in which the user who is not proficient in a free-viewpoint-image viewing/listening operation is allowed to select simply the viewpoint of the user who is proficient in the viewing/listening operation, resulting in facilitation of a viewpoint changing operation by the user who is not proficient in the free-viewpoint-image viewing/listening operation.

CITATION LIST

Patent Document

Patent Document 1: Japanese Patent Application Laid-Open No. 2018-182428

SUMMARY OF THE INVENTION

Problems to be Solved by the Invention

Meanwhile, before viewing/listening of a free viewpoint image, a specific scene of the free viewpoint image is stored in some cases, in order to grasp what kind of moving image the free viewpoint image is or introduce the free viewpoint image to other people.

However, the viewpoint can be changed freely in the free viewpoint image. In addition, at the time of shooing, because representation is sometimes made utilizing a free viewpoint such that a plurality of performers does not all face in the same direction but faces in different directions, for example. Thus, it is often difficult to fully grasp the free viewpoint image with only an image from a single viewpoint.

For storing a plurality of viewpoint images of a free viewpoint image, a method of generating images by manually changing of the viewpoints one by one is troublesome to operate.

The present technology has been made in view of such a situation, and an object of the present technology is to enable simple generation of a plurality of viewpoint images of a free viewpoint image.

Solutions to Problems

An image processing device according to one aspect of the present technology includes: a determination unit configured to determine, corresponding to a user operation, a virtual-viewpoint data group including respective pieces of data of a plurality of virtual viewpoints to a predetermined 3D object; and a generation unit configured to generate, for the plurality of virtual viewpoints, respective virtual viewpoint images each as an image of the 3D object viewed from the corresponding virtual viewpoint.

An image processing method to be executed by an image processing device according to one aspect of the present technology includes: determining, corresponding to a user operation, a virtual-viewpoint data group including respective pieces of data of a plurality of virtual viewpoints to a predetermined 3D object; and generating, for the plurality of virtual viewpoints, respective virtual viewpoint images each as an image of the 3D object viewed from the corresponding virtual viewpoint.

In one aspect of the present technology, determined, corresponding to a user operation, is a virtual-viewpoint data group including respective pieces of data of a plurality of virtual viewpoints to a predetermined 3D object, and generated, for the plurality of virtual viewpoints, is respective virtual viewpoint images each as an image of the 3D object viewed from the corresponding virtual viewpoint.

Note that the image processing device according to the one aspect of the present technology can be achieved by causing a computer to execute a program. The program executed by the computer can be provided by being transmitted through a transmission medium, or by being recorded on a recording medium.

Note that the image processing device may be an independent device or an internal block included in a single device.

BRIEF DESCRIPTION OF DRAWINGS

FIG. 7 illustrates exemplary virtual viewpoint images.

MODE FOR CARRYING OUT THE INVENTION

Hereinafter, embodiments for carrying out the present technology will be described. The description will be given in the following order.

1. Overview of Image Processing System
2. Exemplary Configuration of Reproduction Device
3. Operation of Reproduction Device
4. Modifications
5. Exemplary Configuration of Computer <1. Overview of Image Processing System>

First, the overview of an image processing system with the present technology applied will be described.

Figure 1:
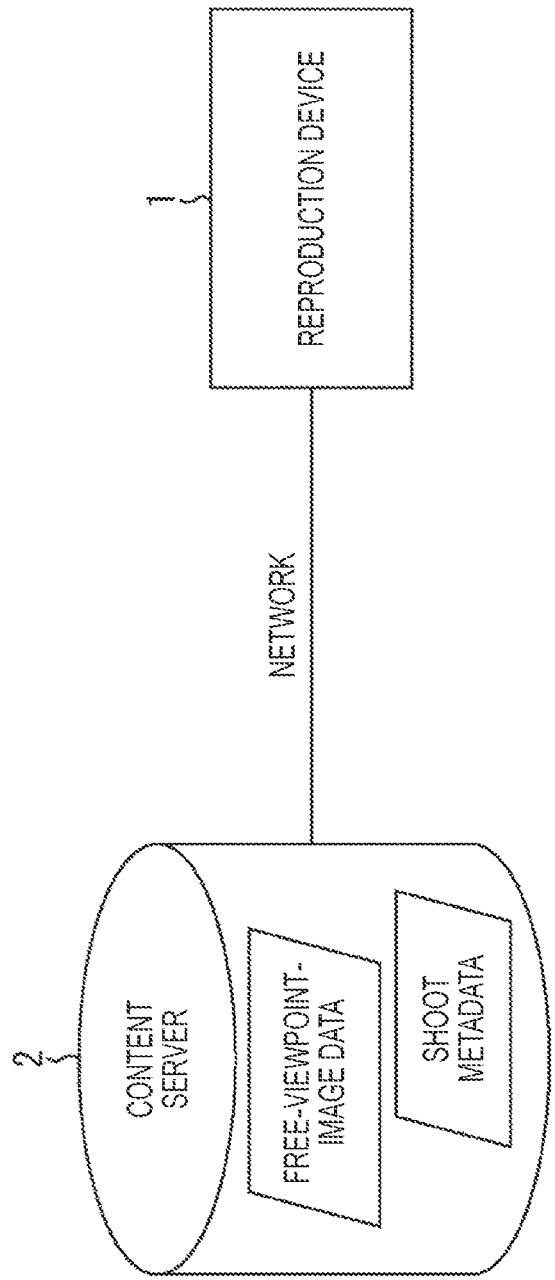
FIG. 1 illustrates an exemplary configuration of an image processing system according to an embodiment of the present technology.

FIG. 1 illustrates an exemplary configuration of the image processing system according to an embodiment of the present technology.

The image processing system in FIG. 1 includes a reproduction device 1 that reproduces a moving image and a content server 2. The reproduction device 1 and the content server 2 are connected through a predetermined network such as the Internet, any of various local area networks (LANs) including Ethernet (registered trademark), or a wide area network (WAN).

The reproduction device 1 acquires free-viewpoint-image data from the content server 2, reproduces the free-viewpoint-image data, and then displays, on a predetermined display, a 3D object as a 3D model of an object recorded as the free-viewpoint-image data. For example, in a case where the reproduction device 1 is a device including a display such as a smartphone, a 3D object is displayed on the display of the reproduction device 1. The reproduction device 1 can also display the 3D object on an external display. The user can view the 3D object displayed on the display from any viewpoint by operating the reproduction device 1.

The content server 2 is, for example, a server device provided on the network. The content server 2 stores free-viewpoint-image data as content. The free-viewpoint-image data includes data of a moving image of a 3D object from which a viewpoint can be selected freely. In some cases, the content server 2 stores, together with the free-viewpoint-image data, shoot metadata or the like including positional information of a camera at the time of shooting of the free-viewpoint-image data. The shoot metadata may include information regarding a virtual-camera path as described later. The shoot metadata is not necessarily stored in the content server 2, and thus may be omitted.

The reproduction device 1 can be provided as a smartphone as described above, and may be a device (image processing device) such as a tablet terminal, a personal computer (PC), or a television receiver.

Figure 2:
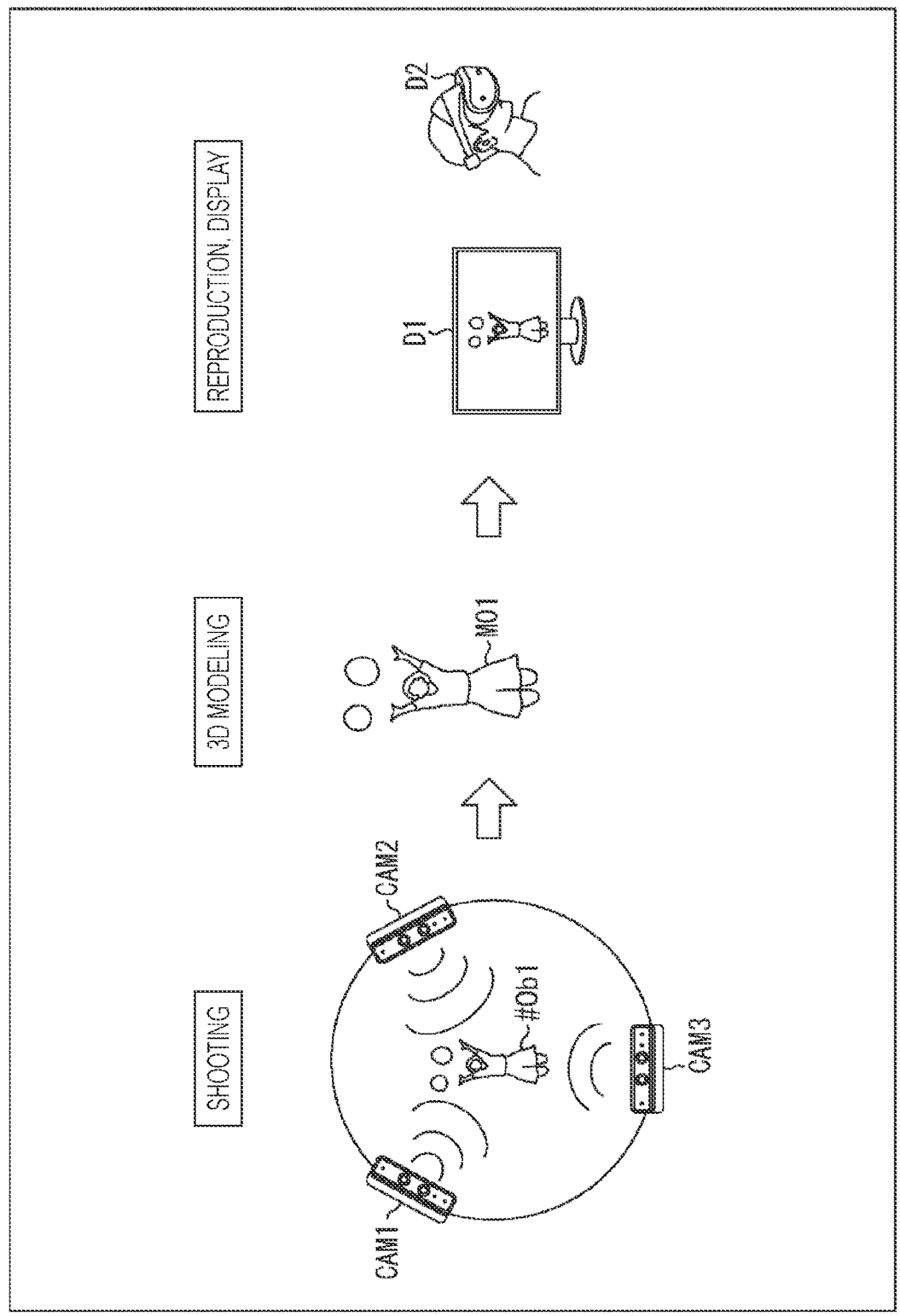
FIG. 2 explanatorily illustrates generation of free-viewpoint-image data stored in a content server.

FIG. 2 explanatorily illustrates generation of the free-viewpoint-image data stored in the content server 2.

As illustrated on the left of FIG. 2, the free-viewpoint-image data is generated on the basis of shot images obtained by shooting an object as a subject with a plurality of shooting devices. Such a shot image includes, for example, a moving image.

In the example of FIG. 2, shooting devices CAM1 to CAM3 are disposed surrounding a subject #Ob1, and a person performing a predetermined motion is being shot as the subject #Ob1 with the three shooting devices CAM. The number of shooting devices CAM is not limited to three, and thus any number of shooting devices CAM are provided. In addition, any number of subjects are provided.

3D modeling is performed with the shot images obtained from the plurality of shooting devices CAM disposed in different directions. As illustrated in the center of FIG. 2, a 3D object MO1 of the subject #Ob1 as a display target is generated. The 3D object MO1 can be generated with, for example, a method such as Visual Hull in which the three-dimensional shape of a subject is clipped with shot images in different directions.

The free-viewpoint-image data that is data of the 3D object generated as described above is read and reproduced by the reproduction device 1 that is a device on the reproduction side. The reproduction device 1 generates (renders) an image (moving image) of the 3D object viewed from a predetermined viewpoint, on the basis of the free-viewpoint-image data, and then causes a viewing/listening device to perform a display.

Specifically, the reproduction device 1 assumes a virtual camera having a shooting range that the viewing/listening range of the user agrees with, requests free-viewpoint-image data of a 3D object captured by the virtual camera among a large number of 3D objects present in the shooting space, performs rendering, and then causes the viewing/listening device to perform a display. Like the viewer/listener can view a subject from any viewpoint in the real world, the viewpoint (virtual viewpoint) of the virtual camera can be set at any position, and an image of the 3D object viewed from any viewpoint can be displayed.

In a case where the free-viewpoint-image data includes data of a plurality of 3D objects, the reproduction side can also display only a 3D object as a viewing/listening target. Furthermore, a moving image representing a predetermined space can be appropriately combined with the background of the 3D object.

Although FIG. 2 illustrates a display D1 and a head mounted display (HMD) D2 as such viewing/listening devices as described above, a smartphone or the like can also be used as a viewing/listening device as described above. The display on which the reproduced 3D object is displayed may be a device integrated with the reproduction device 1 or may be a device separated from the reproduction device 1.

The reproduction device 1 can read and reproduce the free-viewpoint image-data stored in the content server 2, and can display, on the display, an image of the 3D object represented by the free-viewpoint-image data viewed from a predetermined virtual viewpoint. In addition, the reproduction device 1 has a function of simply generating images (virtual viewpoint images) of the 3D object viewed from a plurality of various virtual viewpoints.

Here, the function, that the reproduction device 1 has, of simply generating the plurality of virtual viewpoint images will be described with reference to FIGS. 3, 4, 5, 6, 7, 8A, 8B, 8C, 9A, 9B, and 9C.

Figure 3:
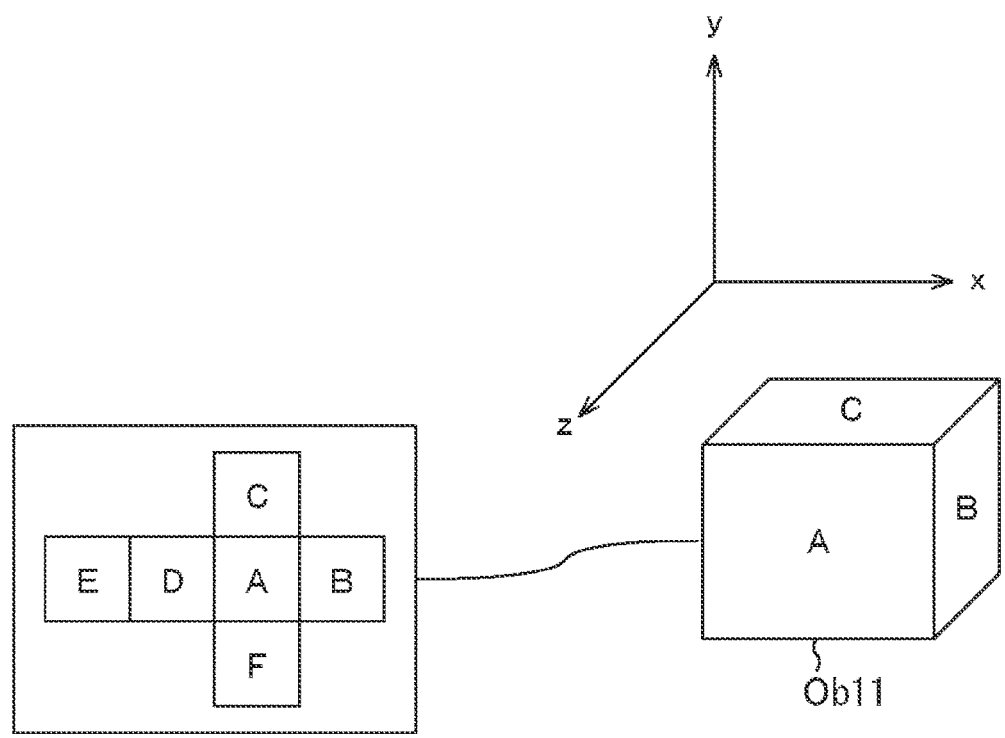
FIG. 3 illustrates an exemplary 3D object.

FIG. 3 illustrates an exemplary 3D object displayed with the free-viewpoint-image data stored in the content server 2.

The free-viewpoint-image data stored in the content server 2 is data of such a cubic 3D object Ob11 as illustrated in FIG. 3. Hereinafter, for convenience of description, it is assumed that the 3D object displayed on the reproduction device 1 by reproducing the free-viewpoint-image data is such a cubic 3D object Ob11 as illustrated in FIG. 3.

As illustrated in FIG. 3, the cubic 3D object Ob11 has faces A to E. As illustrated in the developed view, the 3D object Ob11 is a cube with the face A and the face E facing each other, the face B and the face D facing each other, and the face C and the face F facing each other.

The 3D object Ob11 is such an object on a virtual three-dimensional space represented by a three-dimensional world coordinate system having the x-axis, y-axis, and z-axis as illustrated in the upper right of FIG. 3. For example, the 3D object Ob11 is set on the virtual three-dimensional space such that the center of the 3D object Ob11 is defined as the origin of the world coordinate system.

Figure 4:
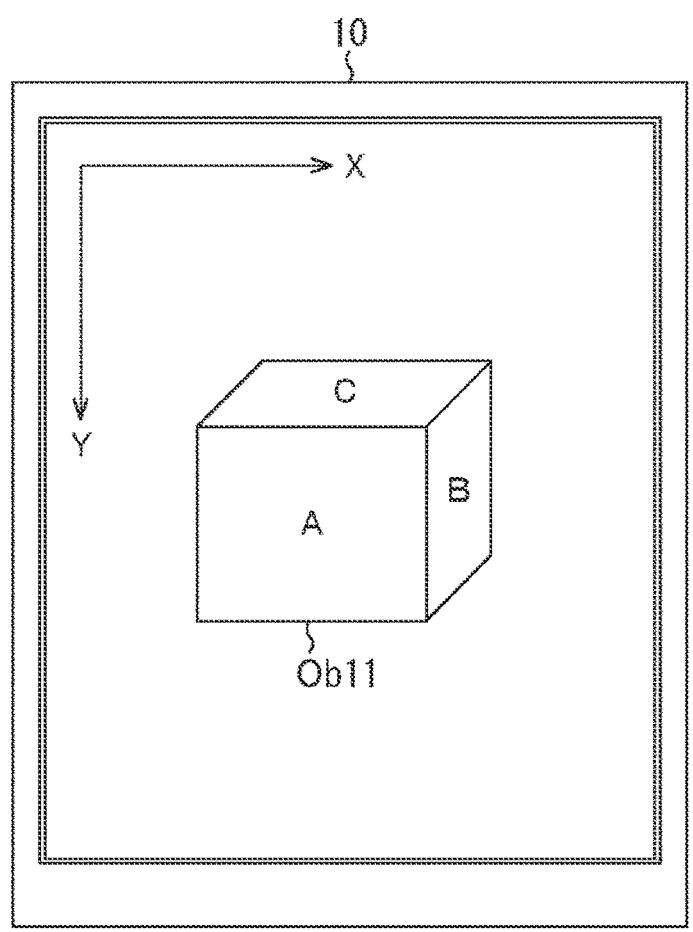
FIG. 4 illustrates an exemplary display of the 3D object reproduced by a reproduction device.

When the free-viewpoint-image data of the cubic 3D object Ob11 stored in the content server 2 is read and reproduced by the reproduction device 1, the reproduction device 1 displays such an image of the 3D object Ob11 as illustrated in FIG. 4.

FIG. 4 illustrates an exemplary display of the 3D object reproduced by the reproduction device 1.

As illustrated in FIG. 4, the reproduction device 1 includes a display 10 displaying an image (moving image) of the 3D object Ob11 viewed from a predetermined virtual viewpoint, on a two-dimensional screen coordinate system having the X-axis and the Y-axis. The virtual viewpoint in display on the display 10 at the point in time of reproduction start is preset as an initial value.

In the example of FIG. 4, displayed is the image of the 3D object Ob11 from the virtual viewpoint at which three faces of the face A, face B, and face C of the 3D object Ob11 are displayed.

Immediately after reproduction of free-viewpoint-image data of a predetermined 3D object by the reproduction device 1, the operation mode of the reproduction device 1 is in the reproduction mode. In the reproduction mode, for example, while viewing/listening a moving image of the 3D object Ob11 displayed on the display 10, the user touches, with a finger, the surface of the display 10 on which a touch panel is layered, and changes the virtual viewpoint to the 3D object Ob11. In accordance with the changing operation of the virtual viewpoint by the user, the image of the 3D object Ob11 displayed on the display 10 is changed to an image from the virtual viewpoint designated by the user.

The user changes the virtual viewpoint of the 3D object Ob11 as necessary, and determines the optimum virtual viewpoint in generation of a virtual viewpoint image of the 3D object Ob11. Then, after determining the optimum virtual viewpoint, the user changes the operation mode of the reproduction device 1 from the reproduction mode to the capture mode. The capture mode is an operation mode for detecting a capture operation by the user and generating, in accordance with the capture operation, a virtual viewpoint image of the 3D object Ob11 viewed from a predetermined virtual viewpoint.

Figure 5:
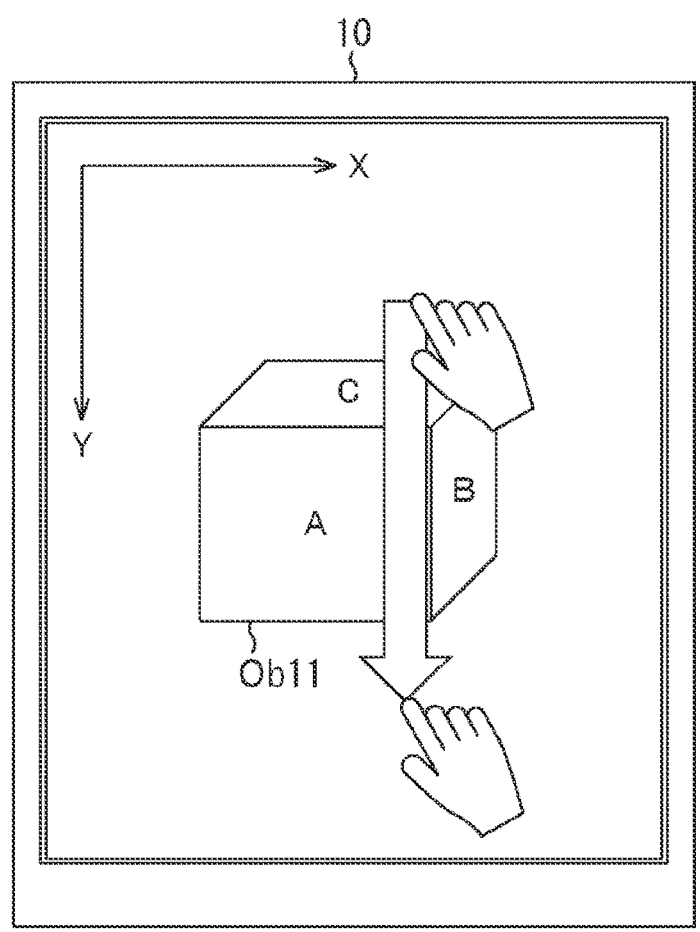
FIG. 5 illustrates an exemplary capture operation performed by a user in the capture mode.

FIG. 5 illustrating an exemplary capture operation performed by the user in the capture mode.

For example, the user performs such a swipe operation as illustrated in FIG. 5, as a capture operation for instruction of generating a virtual viewpoint image. In the example of FIG. 5, the swipe operation is performed from above to below on the display 10.

When the reproduction device 1 detects the swipe operation by the user as the capture operation, the reproduction device 1 generates a virtual-camera path corresponding to the detected swipe operation.

Figure 6:
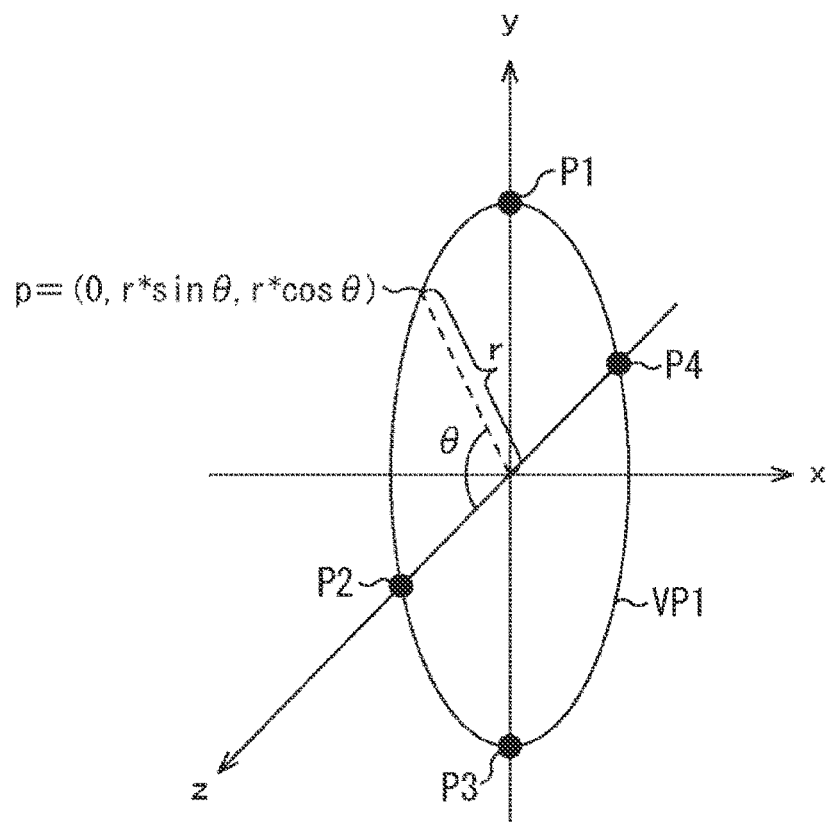
FIG. 6 illustrates an exemplary virtual-camera path associated with a swipe operation.

FIG. 6 illustrates an exemplary virtual-camera path associated with the swipe operation in FIG. 5.

For example, a virtual-camera path VP1 that is circular in trajectory illustrated in FIG. 6 is associated in advance with the swipe operation. Then, when the swipe operation from above to below parallel to the Y-axis of the screen coordinate system of the display 10 is detected, the circular trajectory p on the zy-plane of the world coordinate system is set as the virtual-camera path VP1.

The circular trajectory p on the zy-plane of the world coordinate system is expressed by Expression (1) below.

[Mathematical Expression 1]

$$p=(0, r^*\sin \theta, r^*\cos \theta) \quad (1)$$

In Expression (1), r represents the radius of the circular trajectory, and θ represents the angle between the Z-axis of the world coordinate system and a point on the circular trajectory (0≤θ<360).

In accordance with N number of virtual viewpoint images to be generated determined in advance, for example, at the initial setting, the reproduction device 1 changes θ to the circular trajectory p of the virtual-camera path VP1 corresponding to the swipe operation, and determines N number of virtual viewpoints.

For example, assuming that the N number of virtual viewpoint images to be generated is set to 4 (N=4), each virtual viewpoint image is generated from the corresponding position obtained by dividing the 360-degree circular trajectory p into four equal parts. Thus, the increment value for changing θ is 90° (=360/4), and θ to be substituted into Expression (1) takes four values of 0°, 90°, 180°, and 270°. The positions of the four virtual viewpoints obtained by substituting 0°, 90°, 180°, and 270° into θ in Expression (1) for the circular trajectory p correspond to the intersections where the circular trajectory p intersects the y-axis and the z-axis.

In addition, the order of the four virtual viewpoints is determined by the direction of the swipe operation (the positions of the start point and the end point).

In the example of FIG. 5, corresponding to the swipe operation from above to below on the display 10, a position P1, a position P2, a position P3, and a position P4 on the circular trajectory p are set as the virtual viewpoints in this order as illustrated in FIG. 6.

The position P1, position P2, position P3, and position P4 of the virtual viewpoints determined as described above are included in the virtual-camera path corresponding to the swipe operation by the user. That is, the virtual-camera path is a virtual-viewpoint data group including respective pieces of data of a plurality of virtual viewpoints to the 3D object Ob11.

As described above, corresponding to the swipe operation by the user, the position P1, the position P2, the position P3, and the position P4 are set as the virtual viewpoints in this order. Virtual viewpoint images of the 3D object viewed from the virtual viewpoints are generated in accordance with the set order.

FIG. 7 illustrates exemplary virtual viewpoint images having the respective virtual viewpoints corresponding to, the position P1, position P2, position P3, and position P4 of the virtual-camera path VP1.

As illustrated in FIG. 7, generated are virtual viewpoint images C1 to C4 that are the virtual viewpoint images at the positions P1 to P4 of the virtual-camera path VP1 in FIG. 6. The virtual viewpoint images C1, C2, C3, and C4 are images of the face C, face A, face F, and face E of the 3D object Ob11 viewed from the front, respectively.

That is, in a case where the 3D object Ob11 with the origin of the world coordinate system defined as the center position is viewed from the position P1, the face C of the 3D object Ob11 is viewed in front. In this case, as illustrated at the left end of FIG. 7, an image of the face C of the 3D object Ob11 viewed from the front is generated as the virtual viewpoint image C1.

In addition, in a case where the 3D object Ob11 is viewed from the position P2, the face A of the 3D object Ob11 is viewed in front. In this case, as illustrated on the right of the virtual viewpoint image C1 in FIG. 7, an image of the face A of the 3D object Ob11 viewed from the front is generated as the virtual viewpoint image C2.

Similarly, as the virtual viewpoint images C3 and C4, images of the 3D object Ob11 viewed from the positions P3 and P4 are generated, respectively.

As described above, in accordance with the order of the positions P1 to P4 as the virtual viewpoints, the virtual viewpoint image C1, the virtual viewpoint image C2, the virtual viewpoint image C3, and the virtual viewpoint image C4 are generated in this order.

Although the example in which the user performs the swipe operation from above to below has been given, the swipe operation is performed in any direction. Each virtual-camera path corresponding to a swipe operation in the corresponding direction is set, and each virtual viewpoint image is generated on the basis of the corresponding virtual-camera path that is set.

Figure 8C:
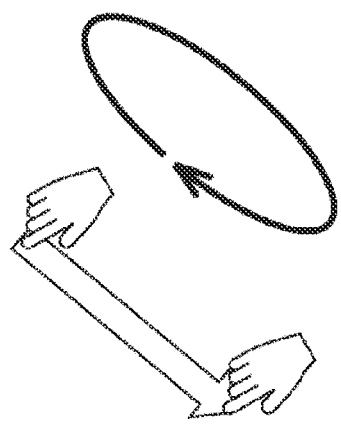
FIGS. 8A, 8B, and 8C illustrate exemplary virtual-camera paths corresponding to directions of swipe operations.
Figure 8B:
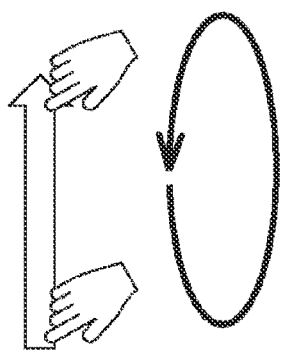
Figure 8A:
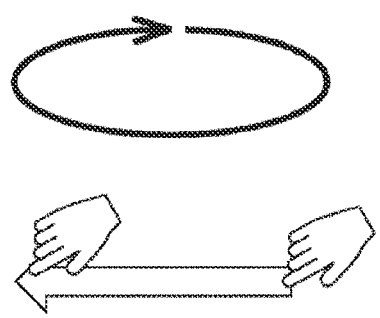

FIGS. 8A, 8B, and 8C illustrate exemplary virtual-camera paths corresponding to the direction of the swipe operations.

For example, in response to a swipe operation, by the user, from below to above on the screen coordinate system of the display 10 as indicated by a solid-white arrow in FIG. 8A, the reproduction device 1 sets, a virtual-camera path different in rotation direction from the virtual-camera path VP1 in FIG. 6 in the world coordinate system, for example.

In response to a horizontal swipe operation, by the user, on the screen coordinate system of the display 10 as indicated by a solid-white arrow in FIG. 8B, the reproduction device 1 sets a horizontal virtual-camera path in the world coordinate system.

In response to a diagonal swipe operation, by the user, on the screen coordinate system of the display 10 as indicated by a solid-white arrow in FIG. 8C, the reproduction device 1 sets a virtual-camera path inclined diagonally in the world coordinate system.

Figure 9C:
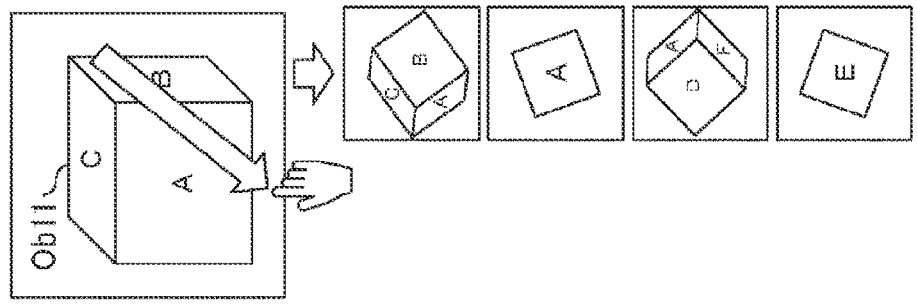
FIGS. 9A, 9B, and 9C illustrate exemplary virtual viewpoint images each generated in accordance with the corresponding swipe operation.
Figure 9B:
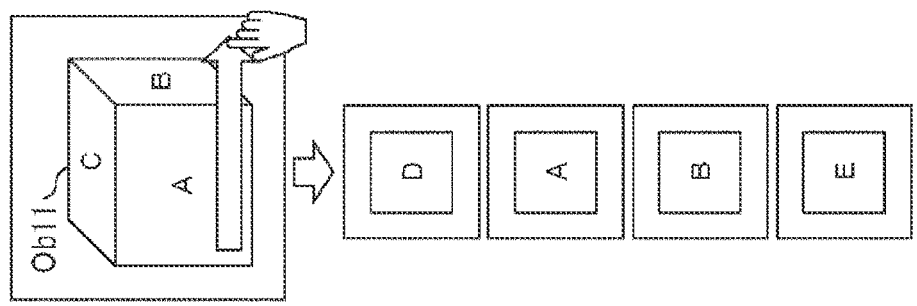
Figure 9A:
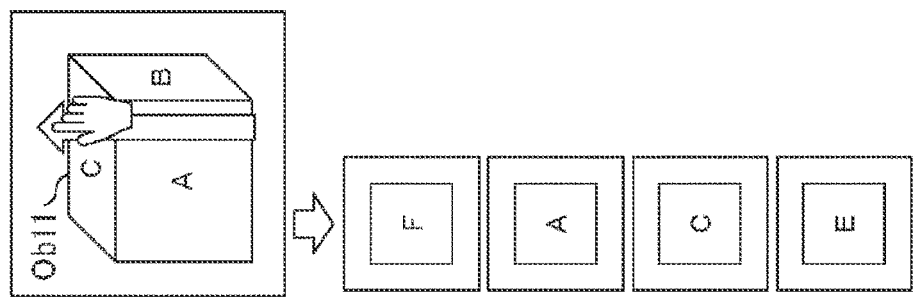

FIGS. 9A, 9B, and 9C illustrate exemplary virtual-viewpoint images each generated in accordance with the corresponding swipe operation in FIGS. 8A, 8B, and 8C.

In a case where the virtual-camera path corresponding to the swipe operation from below to above illustrated in A of FIG. 8A is set, the face F, face A, face C, and face E of the 3D object Ob11 are sequentially viewed from four virtual viewpoints (for example, the positions P3, P2, P1, and P4 in FIG. 6) on the virtual-camera path. In this case, as indicated by the tip of a solid-white arrow in FIG. 9A, four pieces of virtual viewpoint images of the face F, face A, face C, and face E of the 3D object each viewed from the front are generated sequentially.

In a case where the virtual-camera path corresponding to the horizontal swipe operation illustrated in FIG. 8B is set, the face D, face A, face B, and face E of the 3D object Ob11 are sequentially viewed from four virtual viewpoints on the virtual-camera path. In this case, as indicated by the tip of a solid-white arrow in FIG. 9B, four pieces of virtual viewpoint images of the face D, face A, face B, and face E of the 3D object each viewed from the front are generated sequentially.

In a similar manner, in a case where the virtual-camera path corresponding to the diagonal swipe operation illustrated in FIG. 8C is set, sequentially generated are such four pieces of virtual viewpoint images as indicated by the tip of a solid-white arrow in FIG. 9C of the 3D object Ob11 viewed from four viewpoints on the virtual-camera path.

In the example in FIG. 9C, generated are a virtual viewpoint image with the faces A to C of the 3D object Ob11 viewed, a virtual viewpoint image of the face A of the 3D object Ob11 viewed from the front, a virtual viewpoint image with the faces A, D, and F of the 3D object Ob11 viewed, and a virtual viewpoint image of the face E of the 3D object Ob11 viewed from the front.

Figure 10:
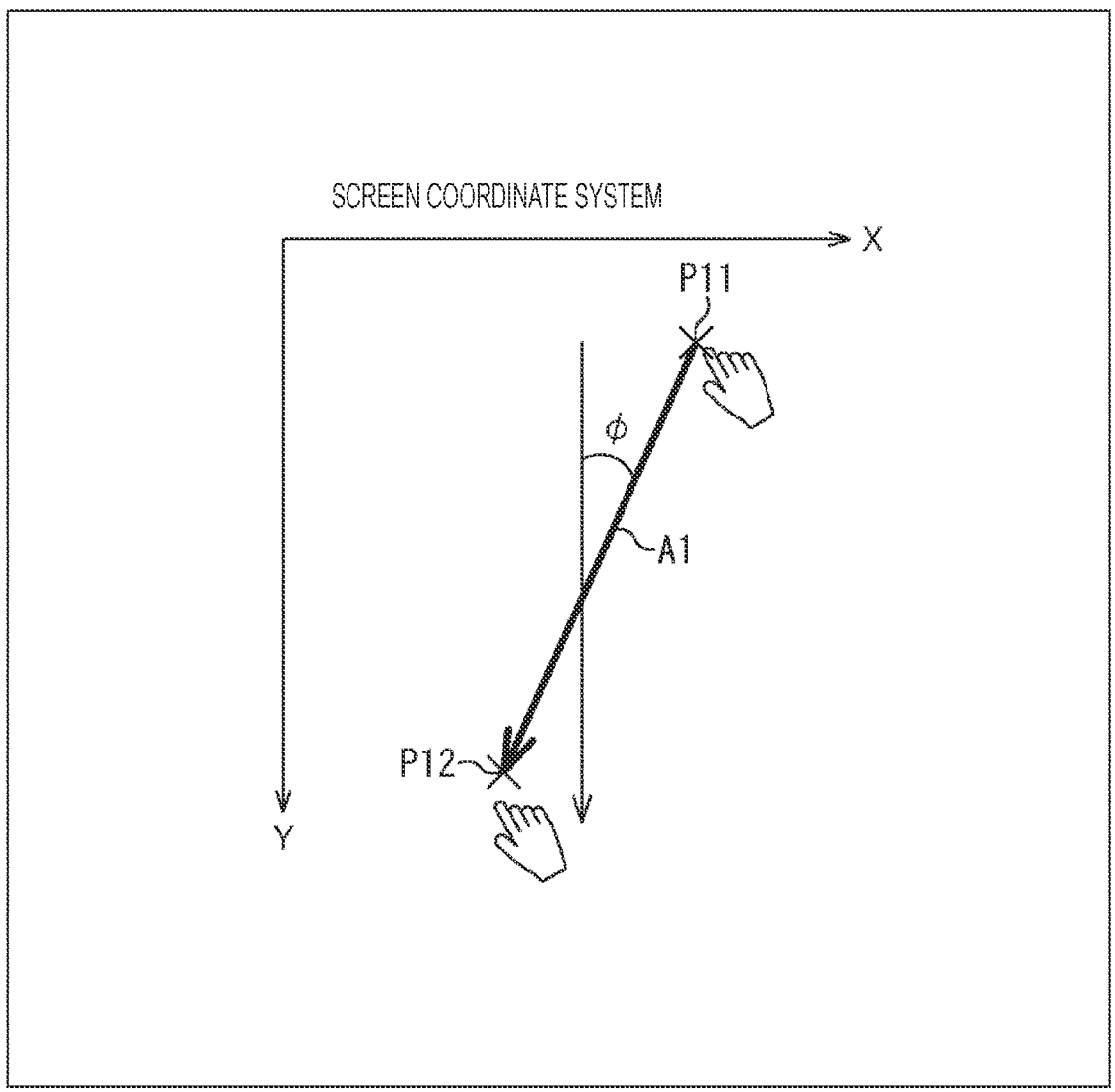
FIG. 10 illustrates an exemplary diagonal swipe operation.

In response to the diagonal swipe operation, by the user, on the screen coordinate system of the display 10 as illustrated in C of FIG. 8C, the reproduction device 1 calculates the angle $\varphi$ between the directional vector A1 of the swipe operation from the start position P11 to the end position P12 of the swipe operation and the Y-axis on the screen coordinate system as illustrated in FIG. 10. Then, the virtual-camera path VP1 that is circular in trajectory in FIG. 6 is rotated with the angle $\varphi$ from the zy-plane of the world coordinate system, so that the virtual-camera path corresponding to the diagonal swipe operation is generated.

Figure 11A:
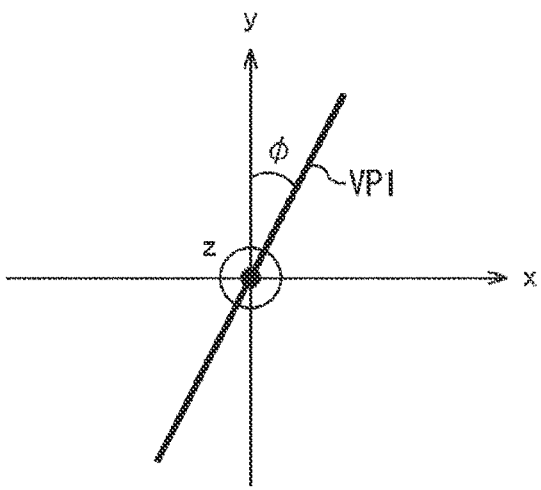
FIGS. 11A and 11B illustrate an exemplary virtual-camera path corresponding to the diagonal swipe operation.

FIG. 11A illustrates the virtual-camera path VP1 that in circular in trajectory generated in accordance with the diagonal swipe operation, viewed from the viewpoint at which the z-axis direction of the world coordinate system is set to the depth direction.

Figure 11B:
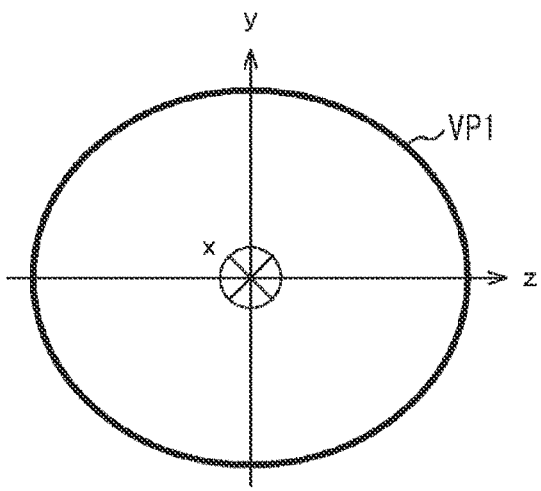

FIG. 11B illustrates the virtual-camera path VP1 that is circular in trajectory generated in accordance with the diagonal swipe operation, viewed from the viewpoint at which the x-axis direction of the world coordinate system is set to the depth direction.

As described above, with the reproduction device 1, the user can generate a plurality of virtual viewpoint images of a 3D object viewed from a plurality of virtual viewpoints, by performing a simple capture operation with one action such as a swipe operation on the display 10 on which the 3D object is displayed.

<2. Exemplary Configuration of Reproduction Device>

Figure 12:
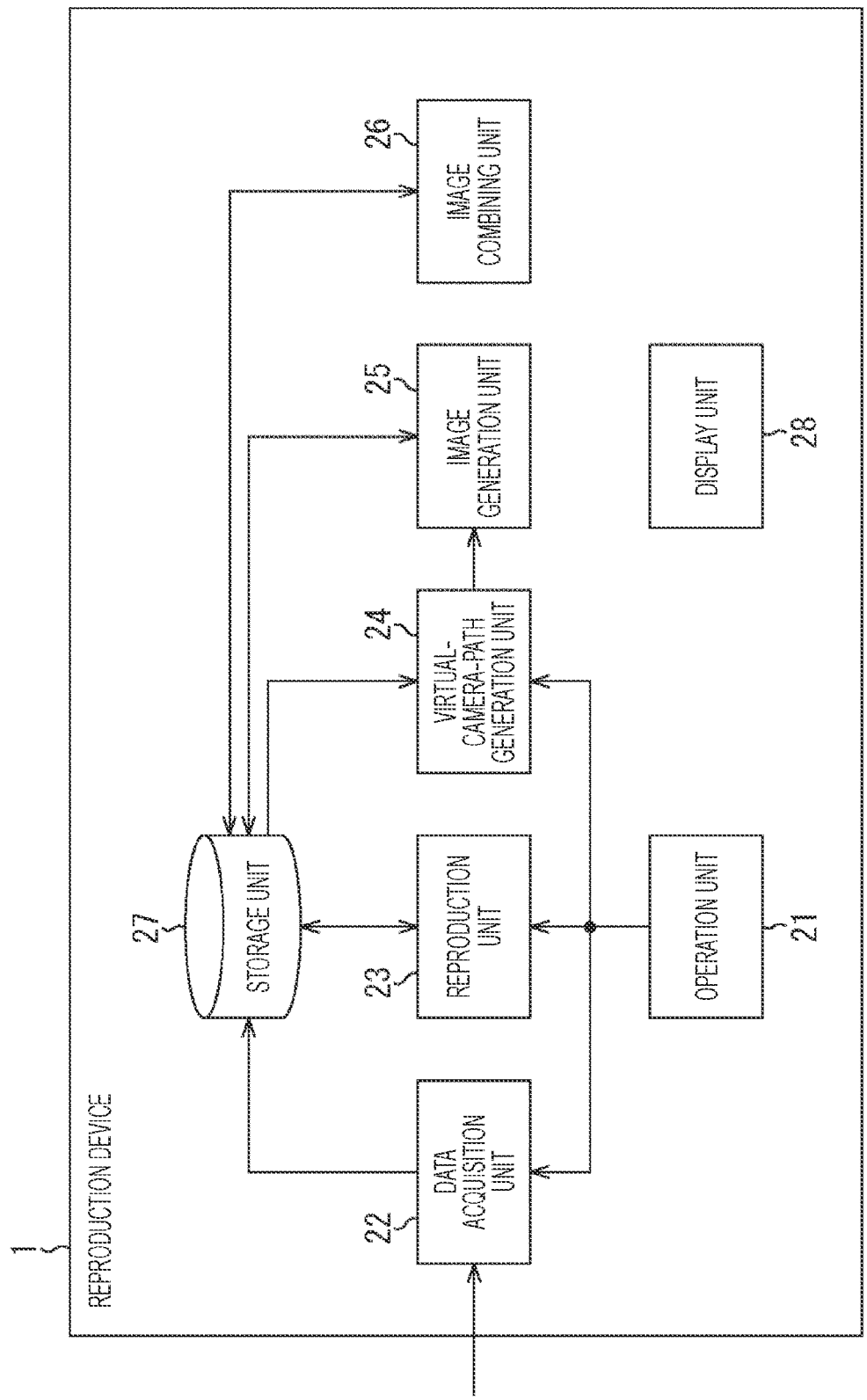
FIG. 12 is a block diagram illustrating an exemplary configuration of the reproduction device.

FIG. 12 is a block diagram illustrating an exemplary configuration of the reproduction device 1.

The reproduction device 1 includes an operation unit 21, a data acquisition unit 22, a reproduction unit 23, a virtual-camera-path generation unit 24, an image generation unit 25, an image combining unit 26, a storage unit 27, and a display unit 28.

The operation unit 21 includes a touch panel monitor, a keyboard, a mouse, a controller, a remote operation device, or the like. The operation unit 21 detects a user operation and outputs information indicating the detail of the detected user operation. The information indicating the detail of the user operation output from the operation unit 21 is appropriately supplied to the data acquisition unit 22, the reproduction unit 23, and the virtual-camera-path generation unit 24.

For example, in a case where the capture mode is set as the operation mode of the reproduction device 1, the operation unit 21 detects a swipe operation performed by the user on the display, and outputs event information indicating the swipe operation to the virtual-camera-path generation unit 24.

In the case where the operation unit 21 outputs the event information indicating the swipe operation to the virtual-camera-path generation unit 24, the event information includes the fact that the swipe operation has been detected as an event, and the coordinates of the start position and end position of the swipe operation on the screen coordinate system of the display.

On the basis of an instruction for acquisition of free-viewpoint-image data as a reproduction target supplied from the operation unit 21, the data acquisition unit 22 acquires, from the content server 2, the free-viewpoint-image data selected by the user, and stores the selected free-viewpoint-image data in the storage unit 27. In a case where shoot metadata corresponding to the free-viewpoint-image data that the data acquisition unit 22 acquires is also stored in the content server 2, the data acquisition unit 22 also acquires the shoot metadata corresponding to the free-viewpoint-image data as necessary.

In the reproduction mode, on the basis of an instruction for reproduction of the free-viewpoint-image data supplied from the operation unit 21, the reproduction unit 23 reads and reproduces the free-viewpoint-image data acquired from the content server 2 and stored in the storage unit 27.

After the entirety of a single piece of free-viewpoint-image data is stored in the storage unit 27 from the content server 2, the reproduction unit 23 may reproduce the stored free-viewpoint-image data, or may reproduce the free-viewpoint-image data by so-called streaming reproduction in which part of the free-viewpoint-image data is reproduced while being acquired sequentially.

Note that in a case where predetermined free-viewpoint-image data is stored in advance in the storage unit 27, the reproduction unit 23 can reproduce the free-viewpoint-image data stored in advance in the storage unit 27, instead of the free-viewpoint-image data acquired from the content server 2.

The reproduction unit 23 causes the display unit 28 to display a virtual viewpoint image of a 3D object as a free viewpoint image obtained by reproducing the free-viewpoint-image data. The data of the virtual viewpoint image of the 3D object is supplied from the reproduction unit 23 to the display unit 28 through a route (not illustrated).

Further, the reproduction unit 23 controls the reproduction of the free-viewpoint-image data on the basis of a user operation detected by the operation unit 21 such as reproduction or stop of a moving image of the 3D object, change of the reproduction speed, or change of the virtual viewpoint.

The virtual-camera-path generation unit 24 generates a virtual-camera path on the basis of event information supplied from the operation unit 21. For example, the event information includes, information indicating a swipe operation performed as a capture operation, and information indicating the coordinates of the start position and end position of the swipe operation. The virtual-camera path is associated with the event information in advance, and a circular trajectory with a radius r is associated with the swipe operation as illustrated in the example of FIG. 6.

The virtual-camera-path generation unit 24 determines the circular trajectory with the radius r associated with the swipe operation, and determines a plurality of virtual viewpoints corresponding to the N number of virtual viewpoint images to be generated determined in advance, in the order based on the start position and end position of the swipe operation. A virtual-viewpoint data group including respective pieces of data of the plurality of virtual viewpoints determined is supplied to the image generation unit 25 as the virtual-camera path.

For the plurality of virtual viewpoints included in the virtual-camera path supplied from the virtual-camera-path generation unit 24, the image generation unit 25 generates respective virtual viewpoint images each as an image of the 3D object Ob11 viewed from the corresponding virtual viewpoint. The image generation unit 25 sequentially generates the virtual viewpoint images in the order of arrangement of the respective pieces of data of the plurality of virtual viewpoints included in the virtual-camera path.

The image generation unit 25 outputs the plurality of pieces of virtual viewpoint images generated to the storage unit 27, and the storage unit 27 stores the plurality of pieces of virtual viewpoint images generated.

The image combining unit 26 acquires the virtual viewpoint images stored in the storage unit 27 and combines the acquired virtual viewpoint images, by a predetermined technique. A virtual viewpoint image resulting from the combining by the predetermined technique is referred to as an index image.

Figure 13A:
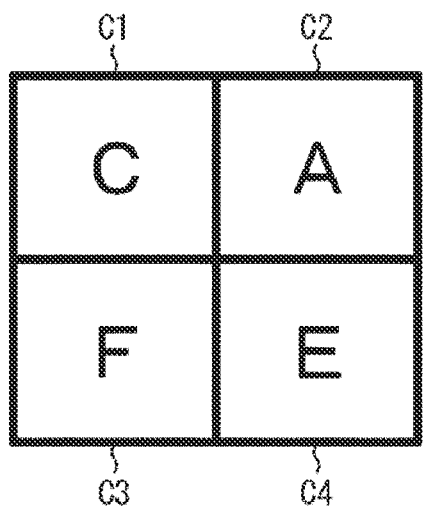
FIGS. 13A and 13B illustrate exemplary index images.
Figure 13B:
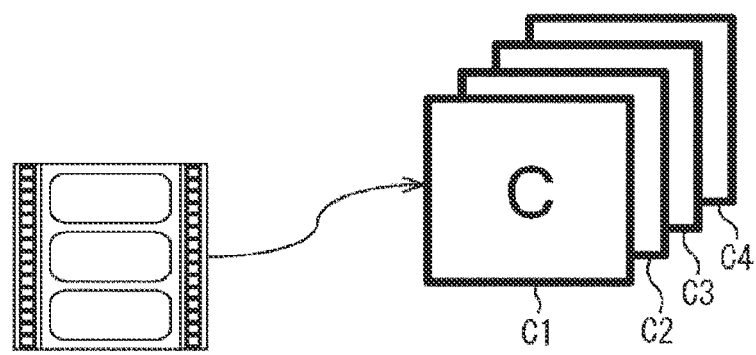

FIGS. 13A and 13B illustrate exemplary index images.

As illustrated in FIG. 13A, for example, an image obtained by combining four pieces of virtual viewpoint images into a single piece of still image is generated as an index image. In the example in FIG. 13A, the virtual viewpoint images C1 to C4 described in FIG. 7 are arranged in a tile shape of 2×2 (height×width) and combined into the single piece of still image.

Alternatively, as illustrated in FIG. 13B, as an index image, generated is an image obtained by combining four pieces of virtual viewpoint images arranged in the order of generation of the virtual viewpoint images as flames included in a moving image. In the example in of FIG. 13B, the virtual viewpoint images C1 to C4 are arranged chronologically in accordance with the order of the generation and combined as the moving image. The moving image as the index image is a moving image in which the viewpoint moves at the same reproduction time in the free viewpoint image.

In such manner, the image combining unit 26 combines a plurality of virtual viewpoint images by a predetermined technique to generate an index image. The technique for combining the plurality of virtual viewpoint images may be determined by an instruction from the user. Note that in a case where combining of virtual viewpoint images is unnecessary, the combining of the virtual viewpoint images is not performed.

Returning to the description of FIG. 12, the image combining unit 26 stores the index image obtained by the combining in the storage unit 27.

In addition to the index image, for example, information regarding the file name of the free-viewpoint-image data used in the generation of the virtual viewpoint images, the reproduction time of the free viewpoint image for which the virtual viewpoint images are generated, and the virtual-camera path used for the generation of the virtual viewpoint images may be stored in the storage unit 27 as metadata of the index image. The index image may be supplied to the display unit 28 and may be displayed thereon.

The storage unit 27 stores a table indicating the association relationship between the capture operation performed by the user in the capture mode and the virtual path generated for the capture operation. Further, the storage unit 27 stores the free-viewpoint-image data acquired from the content server 2. In a case where the shoot metadata corresponding to the free-viewpoint-image data is also acquired, the shoot metadata is also stored in the storage unit 27. Further, the storage unit 27 stores the virtual viewpoint images generated by the image generation unit 25 and the index image generated by the image combining unit 26.

The display unit 28 includes a monitor, a television, a head mounted display (HMD), or the like. The display unit 28 displays, for example, the 3D object reproduced by the reproduction unit 23, the virtual viewpoint images generated by the image generation unit 25, the index image generated by the image combining unit 26. The display unit 28 corresponds to the display 10 in FIGS. 4 and 5.

In the present embodiment, the reproduction device 1 acquires the free-viewpoint-image data as the reproduction target from the content server 2 on the network and displays the 3D object. The free-viewpoint image-data as the reproduction target may be stored in the storage unit 27.

<3. Operation of Reproduction Device>

Figure 14:
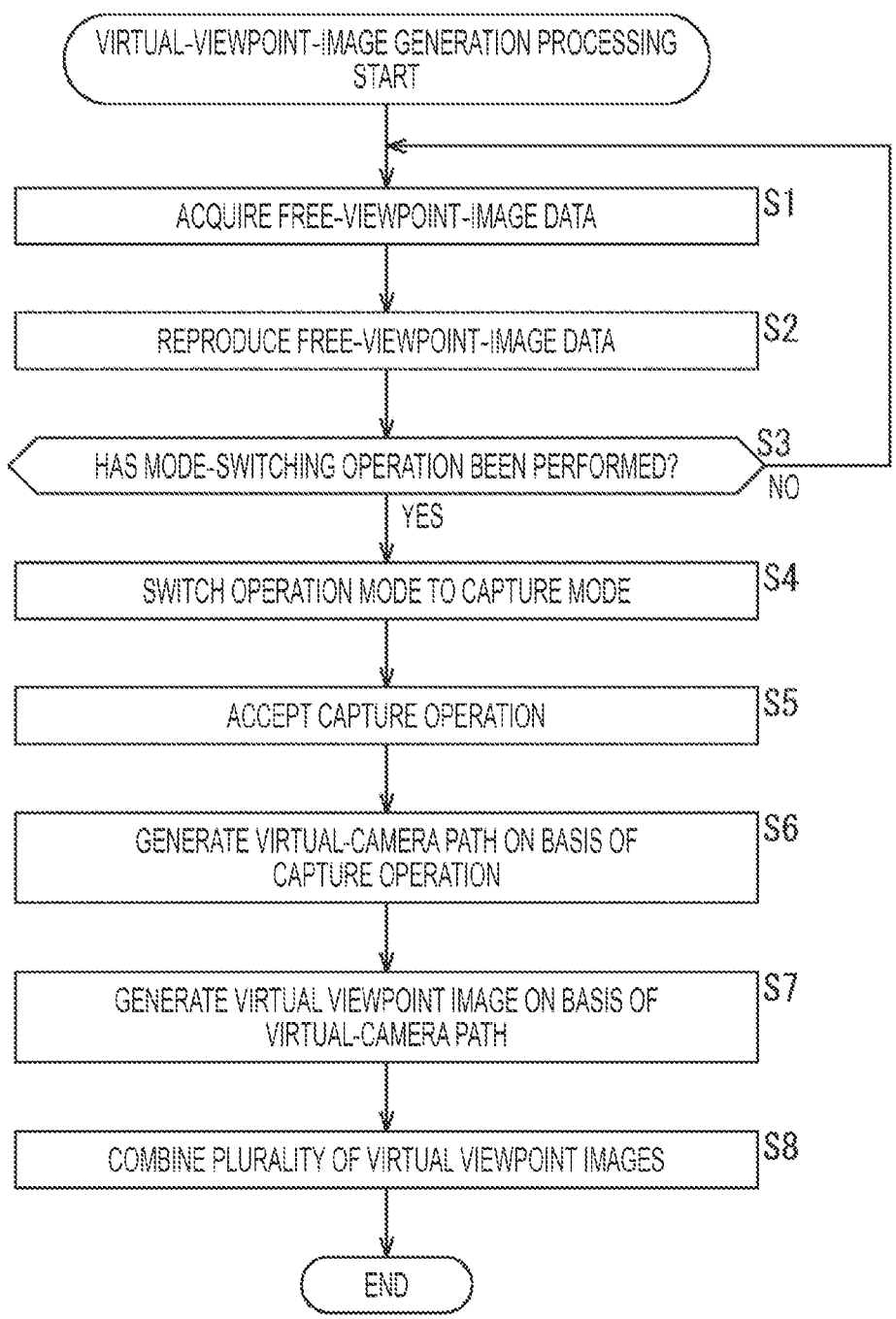

Next, virtual-viewpoint-image generation processing in which the reproduction device 1 generates a virtual viewpoint image on the basis of a capture operation by the user will be described with reference to the flowchart in FIG. 14.

This virtual-viewpoint-image generation processing starts when free-viewpoint-image data as a reproduction target is selected by the user. The operation mode of the reproduction device 1 at the time of the start of the processing is the reproduction mode.

First, in step S1, on the basis of an instruction for acquisition of the free-viewpoint-image data as the reproduction target supplied from the operation unit 21, the data acquisition unit 22 acquires, from the content server 2, the free-viewpoint-image data selected by the user, and stores the selected free-viewpoint-image data in the storage unit 27.

In step S2, the reproduction unit 23 acquires the free-viewpoint-image data from the storage unit 27 and reproduces the free-viewpoint-image data. A moving image of a 3D object based on the reproduced free-viewpoint-image data is displayed on the display unit 28. On the basis of a user operation such as reproduction or stop of the moving image of the 3D object detected by the operation unit 21, change of the reproduction speed, or change of the virtual viewpoint, the reproduction unit 23 performs chronological control such as reproduction or stop of the moving image and spatial control such as change of the virtual viewpoint.

In step S3, on the basis of the information indicating the detail of the user operation supplied from the operation unit 21, the reproduction unit 23 determines whether or not a mode-switching operation for switching the operation mode has been performed.

In a case where it is determined in step S3 that no mode-switching operation has been performed, the processing returns to step S1, and the subsequent processing is performed.

Otherwise, in a case where it is determined in step S3 that the mode-switching operation has been performed, the processing proceeds to step S4, and the reproduction unit 23 switches the operation mode from the reproduction mode to the capture mode. In response to the switching of the operation mode to the capture mode, the moving image of the 3D object stops at the reproduction time at the point in time of the switching.

In step S5, the operation unit 21 accepts a capture operation by the user and outputs event information corresponding to the accepted capture operation to the virtual-camera-path generation unit 24. In a case where the accepted capture operation is a swipe operation, information indicating that the swipe operation has been detected and information regarding the coordinates of the start position and end position of the swipe operation on the screen coordinate system of the display 10 are output as the event information.

In step S6, the virtual-camera-path generation unit 24 generates a virtual-camera path on the basis of the capture operation indicated by the event information. Specifically, the virtual-camera-path generation unit 24 acquires, from the storage unit 27, the trajectory of the virtual-camera path associated with the capture operation. Then, the virtual-camera-path generation unit 24 determines the start point and end point for the trajectory of the virtual-camera path on the basis of the directional vector of the capture operation, and applies a rotating operation. The virtual-camera-path generation unit 24 determines the N number of virtual viewpoints sequentially from the start point of the trajectory of the virtual-camera path with the increment value of the angle θ corresponding to the N number of virtual viewpoint images to be generated determined in advance, for example, at the initial setting. The virtual-viewpoint data group of the N number of virtual viewpoints determined is supplied to the image generation unit 25 as the virtual-camera path.

In step S7, on the basis of the virtual-camera path, the image generation unit 25 generates each virtual viewpoint image of the 3D object viewed from the corresponding virtual viewpoint of the virtual-camera path, outputs each virtual viewpoint image to the storage unit 27, and the storage unit 27 stores each virtual viewpoint image.

In step S8, the image combining unit 26 acquires the plurality of virtual viewpoint images from the storage unit 27, and combines the plurality of virtual viewpoint images acquired, in a predetermined format to generate an index image.

Then, the virtual-viewpoint-image generation processing ends. Note that in a case where an index image obtained by combining the plurality of virtual viewpoint images into a single piece of still image or moving image is unnecessary, the processing of step S8 is omitted. The necessity of generating an index image can be set on, for example, a setting screen.

According to the above processing, by a simple capture operation with one action such as a swipe operation, the user can generate a plurality of virtual viewpoint images of a 3D object of the free-viewpoint-image data being reproduced, viewed from a plurality of virtual viewpoints. Further, an index image obtained by combining the plurality of virtual viewpoint images into a single piece of still image or moving image can be also generated simply.

<4. Modifications>

Exemplary Use of Shoot Metadata

In a case where shoot metadata corresponding to free-viewpoint-image data is stored in the content server 2, information regarding a plurality of virtual-camera paths can be included as part of the shoot metadata.

Each of the plurality of virtual-camera paths included as the part of the shoot metadata includes respective pieces of data of a plurality of virtual viewpoints (virtual-viewpoint data group) having the respective virtual viewpoints corresponding to the positions of shooting devices (real camera positions) at the time of shooting of shot images used for generation of a 3D object.

In this case, on the basis of a capture operation (swipe operation) by the user, the virtual-camera-path generation unit 24 selects the virtual-camera path closest to the capture operation from the plurality of virtual-camera paths included in the shoot metadata, and supplies the selected virtual-camera path to the image generation unit 25.

Generation of virtual viewpoint images based on the virtual-camera path selected from the shoot metadata enables the reproduction device 1 to generate the same (substantially the same) virtual viewpoint images as the shot images at the time of shooting of the 3D object. Such a virtual viewpoint image is an image higher in quality than a virtual viewpoint image having a virtual viewpoint corresponding to the position on the world coordinate system between the shooting position of the shooting of the 3D object and another shooting position.

Event Detected as Capture Operation

Above given has been the example in which a swipe operation is detected as a capture operation by the user and is used as event information. The capture operation by the user, however, may be an operation other than the swipe operation. For example, a user operation on the touch panel such as a double-tap operation, a pinch-in operation, a pinch-out operation, or a knock operation may be detected as the capture operation and a virtual-camera path may be generated.

Further, for example, an accelerometer or the like may detect a shake operation that is an operation for vibrating the reproduction device 1 as the capture operation, and a virtual-camera path may be generated.

In a case where the operation unit 21 includes a keyboard or a mouse, for example, a drag operation with the mouse, a double-click operation with the mouse, pressing of a specific button with which an application is provided, or a user operation such as a predetermined keyboard operation may be detected as the capture operation, and a virtual-camera path may be generated.

In a case where a microphone is provided as the operation unit 21 and voice can be input by utterance of the user, for example, a virtual-camera path may be generated by input of voice such as "path 1" or "path 2" corresponding to the type of the virtual-camera path.

Event information regarding an event detected such a capture operation as described above may be associated with a single virtual-camera path or may be associated with different virtual-camera paths in accordance with the event information. The event information and the virtual-camera path can be associated on a one-to-one basis, so that the virtual-camera path associated with the detected event information can be selected.

Trajectory of Virtual-Camera Path

Above given has been the example in which a virtual-camera path that is circular in trajectory is generated in association with a capture operation; however, the trajectory of the virtual-camera path is not limited to the circular trajectory. For example, the trajectory of the virtual-camera path may be a spiral trajectory, an elliptical trajectory, a triangular trajectory, a polygonal trajectory, or the like. Further, the trajectory of the virtual-camera path may be associated to be different depending on an event detected as the capture operation.

Control of N Number of Virtual Viewpoint Image to be Generated, in Accordance with Speed of Swipe Operation Above given has been the example in which the number of virtual viewpoints set on the circular trajectory of a virtual-camera path is determined in advance, for example, at the initial setting. The number of virtual viewpoints, however, may be controlled in accordance with the speed of a swipe operation performed by the user.

For example, in a case where the speed of the swipe operation is slower than a predetermined speed, the increment value of the angle θ for determining a virtual viewpoint is set to be smaller. In this case, the number of virtual viewpoints included in a single virtual-camera path increases, resulting in an increase in the number of virtual viewpoint images generated on the basis of the virtual-camera path. As a result, the virtual viewpoint images achieves smooth motion.

On the other hand, in a case where the speed of the swipe operation is faster than the predetermined speed, the increment value of the angle θ for determining the virtual viewpoint is set to be larger. In this case, the number of virtual viewpoints included in the single virtual-camera path decreases, resulting in a decrease in the number of virtual viewpoints generated on the basis of the virtual-camera path. As a result, the virtual viewpoint images achieves coarse motion.

Control of Radius r by Pressing in Swipe Operation

For example, the pressure from a finger of the user in a swipe operation may be detected, and the radius r of a circular trajectory may be controlled in accordance with the strength of the pressure from the use's finger. For example, in a case where the pressure from the user's finger is lower than a predetermined pressure, the radius r is set to be larger than a predetermined value. That is, a virtual viewpoint image having a virtual viewpoint away from the origin of a world coordinate system is generated. On the other hand, in a case where the pressure of the user's finger is higher than the predetermined pressure, the radius r is set to be smaller than the predetermined value. That is, a virtual viewpoint image having a virtual viewpoint away from the origin of the world coordinate system is generated.

Above given has been the example in which the reproduction device 1 generates virtual viewpoint images of a 3D model at the point in time (time) of stop of reproduction after the user changes the operation mode to the capture mode. Therefore, the plurality of virtual viewpoint images generated is image at the same reproduction time. However, in addition to the virtual viewpoint images at the point in time (time) of the stop of the reproduction, the image generation unit 25 may generate virtual viewpoint images of frames before and after the point in time.

<5. Exemplary Configuration of Computer>

The above flow of the processing can be executed by hardware or software. In a case where the above flow of the processing is executed by software, a program included in the software is installed from a program recording medium onto, for example, a computer embedded in dedicated hardware or a general-purpose personal computer.

Figure 15:
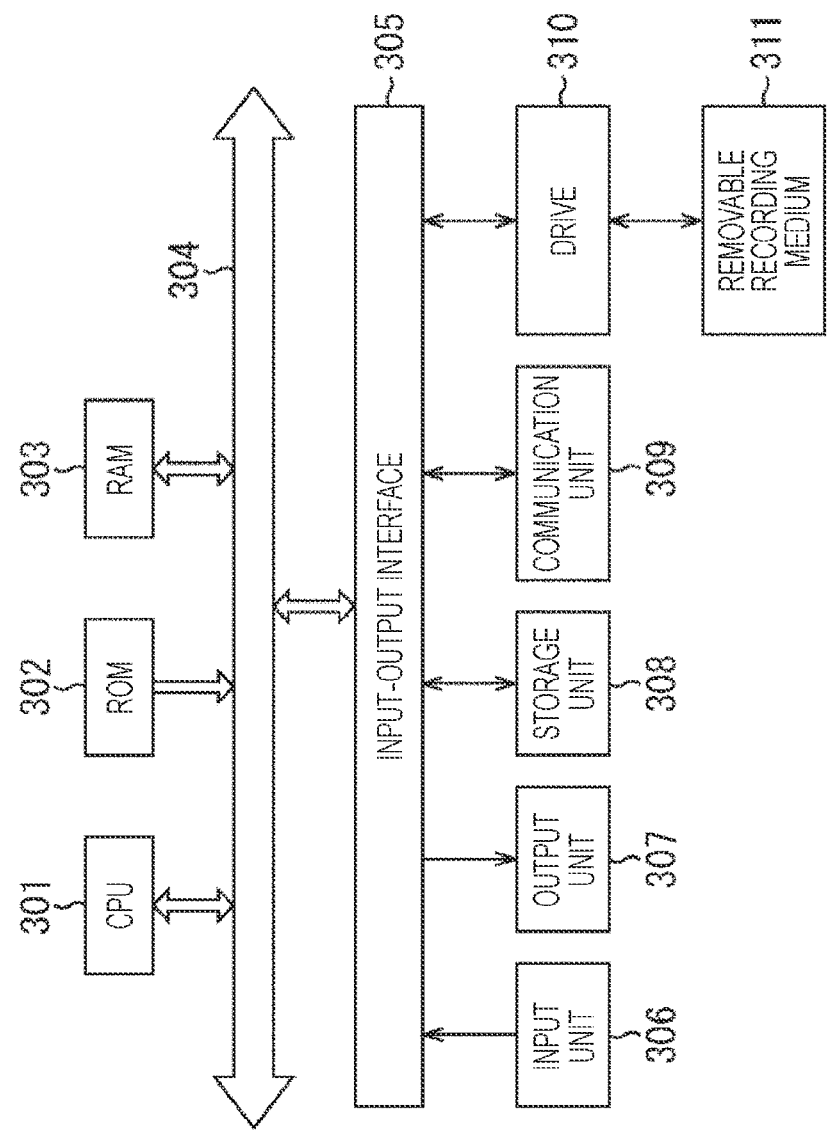

FIG. 15 is a block diagram illustrating an exemplary hardware configuration of a computer that executes the above flow of the processing in accordance with the program.

A central processing unit (CPU) 301, a read only memory (ROM) 302, and a random access memory (RAM) 303 are mutually connected through a bus 304.

Further, an input-output interface 305 is connected to the bus 304. An input unit 306, an output unit 307, a storage unit 308, a communication unit 309, and a drive 310 are connected to the input-output interface 305.

The input unit 306 includes a keyboard, a mouse, a microphone, a touch panel, an input terminal, and the like. The output unit 307 includes a display, a speaker, an output terminal, and the like. The storage unit 308 includes a hard disk, a RAM disk, a non-volatile memory, and the like. The communication unit 309 includes a network interface and the like. The drive 310 drives a removable recording medium 311 such as a magnetic disk, an optical disk, a magneto-optical disk, or a semiconductor memory.

In the computer having the configuration as above, the CPU 301 loads, for example, a program stored in the storage unit 308, into the RAM 303 through the input-output interface 305 and the bus 304 to execute the program, and thus the above flow of the processing is executed. In addition, data necessary for execution of various types of processing by the CPU 301 is stored appropriately in the RAM 303, for example.

The program executed by the computer (CPU 301) can be provided by being recorded on, for example, the removable recording medium 311 as a package medium. Alternatively, the program can be provided through a wired or wireless transmission medium such as a local area network, the Internet, or digital satellite broadcasting.

In the computer, the program can be installed in the storage unit 308 through the input-output interface 305 by attachment of the removable recording medium 311 to the drive 310. Alternatively, the program can be received by the communication unit 309 through the wired or wireless transmission medium and can be installed in the storage unit 308. In addition, the program can be preinstalled in the ROM 302 or the storage unit 308.

Note that, in the present specification, it is certain that the steps described in the flowchart are executed chronologically along the described order. The steps described in the flowchart, however, may be executed parallelly or with necessary timing, for example, a call is made, without being necessarily executed chronologically.

Note that, in the present specification, the system means a collection of a plurality of constituent elements (devices, modules (components), and others). Thus, it is not concerned whether or not all the constituent elements are included in the same casing. Therefore, a plurality of devices housed in separate casings and connected through a network, and a single device having a plurality of modules housed in a single casing are both systems.

Note that the effects described in the present specification are merely exemplified and are not intended to be limiting, and other effects may be provided.

The embodiments of the present technology are not limited to the above embodiments, and thus various modifications can be made without departing from the gist of the present technology.

For example, the present technology can adopt a configuration of cloud computing in which a single function is subjected to processing by sharing and collaborating among a plurality of devices through a network.

In addition, each step described in the above flowchart can be executed by a single device, or can be executed by sharing among a plurality of devices.

Furthermore, in a case where a plurality of pieces of processing is included in a single step, the plurality of pieces of processing included in the single step can be executed by a single device, or can be executed by sharing among a plurality of devices.

The present technology can also adopt the following configurations.

(1)
An image processing device including:
a determination unit configured to determine, corresponding to a user operation, a virtual-viewpoint data group including respective pieces of data of a plurality of virtual viewpoints to a predetermined 3D object; and
a generation unit configured to generate, for the plurality of virtual viewpoints, respective virtual viewpoint images each as an image of the 3D object viewed from the corresponding virtual viewpoint.

(2)
The image processing device according to (1) described above,
in which the determination unit determines, corresponding to the user operation to the 3D object on a two-dimensional coordinate system displayed on a display, the virtual-viewpoint data group of the 3D object on a three-dimensional coordinate system.

(3)
The image processing device according to (2) described above,
in which the determination unit calculates a directional vector on the two-dimensional coordinate system corresponding to the user operation, and determines the virtual-viewpoint data group on the basis of the directional vector calculated.

(4)
The image processing device according to (3) described above,
in which the determination unit determines an arrangement of the respective pieces of data of the plurality of virtual viewpoints in the virtual-viewpoint data group, in accordance with the directional vector calculated.

(5)
The image processing device according to (3) or (4) described above,
in which the user operation corresponds to either a swipe operation or a drag operation on the display.

(6)
The image processing device according to any of (1) to (5) described above,
in which the user operation and the virtual-viewpoint data group are associated on a one-to-one basis, and
the determination unit determines the virtual-viewpoint data group associated with the user operation.

(7)
The image processing device according to (1) described above, further including:
a combining unit configured to combine the plurality of virtual viewpoint images generated one-to-one for the plurality of virtual viewpoints.

(8)
The image processing device according to (7) described above,
in which the combining unit combines the plurality of virtual viewpoint images into a single still image.

(9)
The image processing device according to (7) described above,
in which the combining unit combines the plurality of virtual viewpoint images into a single moving image.

(10)
The image processing device according to any of (1) to (9) described above, further including:
an acquisition unit configured to acquire data of the 3D object and shoot metadata when the 3D object is shot,
in which the determination unit determines, corresponding to the user operation, the virtual-viewpoint data group predetermined, from a plurality of the virtual-viewpoint data groups included in the shoot metadata.

(11)
An image processing method to be executed by an image processing device, the method including:
determining, corresponding to a user operation, a virtual-viewpoint data group including respective pieces of data of a plurality of virtual viewpoints to a predetermined 3D object; and
generating, for the plurality of virtual viewpoints, respective virtual viewpoint images each as an image of the 3D object viewed from the corresponding virtual viewpoint.

REFERENCE SIGNS LIST

1 Reproduction device
22 Data acquisition unit
24 Virtual-camera-path generation unit
25 Image generation unit
26 Image combining unit

The invention claimed is:

1. An image processing device, comprising:
a central processing unit (CPU) configured to:
  determine, corresponding to a user operation, a virtual-viewpoint data group including respective pieces of data of a plurality of virtual viewpoints to a specific 3D object;
  generate, for the plurality of virtual viewpoints, a plurality of virtual viewpoint images of the specific 3D object,
    wherein each of the plurality of virtual viewpoint images corresponds to an image of the specific 3D object viewed from a corresponding virtual viewpoint of the plurality of virtual viewpoints; and
  combine the plurality of virtual viewpoint images generated for the plurality of virtual viewpoints.

2. The image processing device according to claim 1, wherein the CPU is further configured to determine, corresponding to the user operation to the specific 3D object on a two-dimensional coordinate system displayed on a display, the virtual-viewpoint data group of the specific 3D object on a three-dimensional coordinate system.

3. The image processing device according to claim 2, wherein the CPU is further configured to:
  calculate a directional vector on the two-dimensional coordinate system corresponding to the user operation, and
  determine the virtual-viewpoint data group based on calculated directional vector.

4. The image processing device according to claim 3, wherein the CPU is further configured to determine, based on the calculated directional vector, an arrangement of the respective pieces of data of the plurality of virtual viewpoints in the virtual-viewpoint data group.

5. The image processing device according to claim 3, wherein the user operation corresponds to one of a swipe operation or a drag operation on the display.

6. The image processing device according to claim 1, wherein
  the user operation and the virtual-viewpoint data group are associated on a one-to-one basis, and
  the CPU is further configured to determine the virtual-viewpoint data group associated with the user operation.

7. The image processing device according to claim 1, wherein the CPU is further configured to combine the plurality of virtual viewpoint images into a single still image.

8. The image processing device according to claim 1, wherein the CPU is further configured to combine the plurality of virtual viewpoint images into a single moving image.

9. The image processing device according to claim 1, wherein the CPU is further configured to:
  acquire the respective pieces of data of the specific 3D object and shoot metadata, based on shooting of the specific 3D object, and
  determine, corresponding to the user operation, the virtual-viewpoint data group, from a plurality of virtual-viewpoint data groups included in the shoot metadata.

10. An image processing method to be executed by an image processing device, the image processing method comprising:
  determining, corresponding to a user operation, a virtual-viewpoint data group including respective pieces of data of a plurality of virtual viewpoints to a specific 3D object;
  generating, for the plurality of virtual viewpoints, a plurality of virtual viewpoint images of the specific 3D object,
    wherein each of the plurality of virtual viewpoint images corresponds to an image of the specific 3D object viewed from a corresponding virtual viewpoint of the plurality of virtual viewpoints; and
  combining the plurality of virtual viewpoint images generated for the plurality of virtual viewpoints.

11. The image processing device according to claim 5, wherein the CPU is further configured to determine a number of virtual viewpoints of the plurality of virtual viewpoints based on a speed of the swipe operation.

* * * * *